United States Patent
Schwenk et al.

(10) Patent No.: US 7,340,758 B1
(45) Date of Patent: Mar. 4, 2008

(54) METHOD AND DEVICE FOR ROUTING OF SPECIFIC DATA, PARTICULARLY RECEIVING RIGHTS, IN A PAY-TV TERMINAL

(75) Inventors: Joerg Schwenk, Dieburg (DE); Stefan Heuser, Messel (DE); Christoph Schaaf, Darmstadt (DE); Joachim Fingerholz, Darmstadt (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/529,644

(22) PCT Filed: Sep. 26, 1998

(86) PCT No.: PCT/EP98/06139

§ 371 (c)(1),
(2), (4) Date: Apr. 17, 2000

(87) PCT Pub. No.: WO99/21361

PCT Pub. Date: Apr. 29, 1999

(30) Foreign Application Priority Data

Oct. 17, 1997 (DE) ................................ 197 45 969

(51) Int. Cl.
*H04N 7/16* (2006.01)
(52) U.S. Cl. ........................................... 725/6; 725/25
(58) Field of Classification Search .................. 725/2, 725/4, 6, 25, 133, 132, 141, 134, 153, 140, 725/142, 152; 705/14, 17, 41; 235/375, 235/380, 381, 449, 451, 492, 493, 439; 340/5.21, 340/5.25, 5.65, 5.74
See application file for complete search history.

(56) References Cited

U.S. PATENT DOCUMENTS

| | | | | | |
|---|---|---|---|---|---|
| 5,144,663 | A | * | 9/1992 | Kudelski et al. | 380/230 |
| 5,534,857 | A | * | 7/1996 | Laing et al. | 340/5.74 |
| 5,978,649 | A | * | 11/1999 | Kahn | 725/25 |

FOREIGN PATENT DOCUMENTS

| | | | |
|---|---|---|---|
| GB | 2 261 580 | | 5/1993 |
| GB | 2311451 A | * | 9/1997 |
| WO | 93 07715 | | 4/1993 |
| WO | WO 9607267 A2 | * | 3/1996 |

* cited by examiner

*Primary Examiner*—Andrew Y Koenig
(74) *Attorney, Agent, or Firm*—Kenyon & Kenyon LLP

(57) ABSTRACT

A method and device for relaying specific data, especially receiving rights, to a pay television terminal. The data originating from a transmitter is transmitted to the pay television terminal via a transmission medium with the application of mobile data carriers, especially chipcards. The pay television terminal temporarily stores specific data, and afterwards, a specific mobile data carrier is connected to the pay television terminal in a communicative manner. The receiving rights linked to said mobile data carriers are relayed and stored on the data carriers.

2 Claims, 4 Drawing Sheets

METHOD AND DEVICE FOR ROUTING OF SPECIFIC DATA, PARTICULARLY RECEIVING RIGHTS, IN A PAY-TV TERMINAL

FIELD OF THE INVENTION

The present invention relates to a method and a device for routing of specific data, particularly receiving rights, in a pay-TV terminal, which are transmitted from a transmitter via a transmission medium to the pay-TV terminal, using mobile data carriers, particularly chipcards.

RELATED TECHNOLOGY

It is known that pay-TV systems employ "conditional access systems" in order to ensure that pay-TV programs can be received only by entitled customers. This is accomplished by encryption of the program contents, by storage of receiving rights in a security module in the terminal and by the addition of receiving conditions to the actual program contents.

Terminals for receiving a pay-TV program are usually set-top boxes or decoders. However, other terminals such as PC cards or PCMCIA modules are also possible, or the terminal may also be integrated into a television set. At present, the security modules used are usually chipcards which are not permanently connected to the terminal, but can also be removed from it.

The program contents are encrypted, in that the program data are encrypted by an encryption algorithm such as the DVB common-scrambling algorithm, or with the DES algorithm, and are decrypted in the pay-TV terminal.

The receiving conditions are added to a program in the form of "entitlement control messages" (ECMs) which are transmitted with the program contents. These ECMs are associated in fixed manner with the program contents and make it possible for the encrypted program contents to be decrypted again, thereby enabling the customer to use picture and sound in the accustomed manner.

The receiving rights are transmitted in the form of "entitlement management messages" (EMMs). The program contents, the receiving conditions and the receiving rights are transmitted over the same transmission medium (cable, satellite, terrestrial broadcast, etc.). However, the receiving rights are not linked with the program contents, but with a logical address of the terminal of the customer or with that of the security module.

The basic principle of addressing in pay-TV systems lies in storing all the receiving rights of a customer on his/her personal security module. This also enables a customer to use a different terminal to view the pay-TV programs to which he has subscribed or which he has bought (when traveling, for example). Consequently, the terminal itself does not contain an address.

Since the receiving rights are always addressed to a security module, usually in the form of a chipcard, the pay-TV terminal filters out from the stream of received receiving rights only those which are addressed to the current chipcard that is presently in communication with the terminal. The pay-TV terminal receives additionally required filter criteria from the current chipcard. This means that a customer can only receive new receiving rights when his chipcard is in communication with a pay-TV terminal. Therefore, pay-TV customers are advised to continually leave their chipcards in the pay-TV terminal. However, since the program provider must also expect that customers will not follow this advice, the program provider must repeatedly transmit the receiving rights over a long period of time, which, given large numbers of customers, necessitates a tremendous data capacity.

With this concept, it is impossible for several customers to access a pay-TV terminal with their individual chipcards. Consequently, each customer must have his own terminal in order to ensure that he receives his receiving rights as well.

WO 93/07715 A1 describes a pay-TV terminal which includes a card reader, a microprocessor and a memory, in which user-specific demands on the pay-TV terminal can be input via a chipcard and the card reader. As soon as the chipcard is inserted into the card reader, the data are downloaded from the chipcard and stored in the memory.

Therefore, an object of the present invention is to provide a method and device for routing of specific data, particularly receiving rights, in a pay-TV terminal which no longer have the above disadvantages.

In an embodiment according to the present invention, the pay-TV terminal buffers certain data, particularly the receiving rights, and, once a specific mobile data carrier, particularly a chipcard, is in communication with the pay-TV terminal, the receiving rights belonging to this mobile data carrier are routed to said mobile data carrier and stored. For this purpose, the pay-TV terminal uses a list to store a certain number of chipcard numbers, together with chipcard-specific filter information, with which the pay-TV terminal is to cooperate. When a chipcard which was never in communication with the pay-TV terminal is inserted into the pay-TV terminal for the first time, the number of the chipcard is stored in the pay-TV terminal. Thus, the pay-TV terminal "knows" which receiving rights it must filter out from the data stream of all transmitted receiving rights in order to be able to store those receiving rights in the list.

In another embodiment according to invention the length of the list and/or the precise composition of the list is predetermined to be variable or fixed. This makes it possible, depending on the technical possibilities of the pay-TV terminal, to configure a memory of the pay-TV terminal for the list on the one hand and, on the other hand, for other purposes not further described here. Since the storage capacity of the pay-TV terminal is not unlimited, the list is dimensioned to a certain size, so that only a certain number of chipcard numbers can be stored in the list in the pay-TV terminal.

However, it is also possible for the list to be generated automatically by the pay-TV terminal according to fixed rules.

In a further embodiment according to the present invention, the list is entered manually by the customer. For this purpose, it is necessary that the customer independently program the numbers of the chipcard into the pay-TV terminal. However, it is also conceivable for the list to be transferred into the pay-TV terminal via the medium. In this case, the system operator transmits the chipcard numbers via the transmission path to the pay-TV terminal of the customer; this, of course, presupposes that the terminal can be addressed. Consequently, the chipcard numbers can be transferred via this path into the list of the pay-TV terminal and stored there.

It is further provided that a mobile data carrier, particularly a chipcard, transmits filter information to the pay-TV terminal as soon as it is in communication with the pay-TV terminal. The pay-TV terminal requires this filter information in order to be able to filter out from the stream of transmitted receiving rights, those rights which are relevant for the chipcard in question.

In addition, provision is made that, with the aid of a preset prioritization, the receiving rights are deleted if the list available in the pay-TV terminal is exceeded. If the memory space of the pay-TV terminal available for a chipcard is exceeded, a prioritization logic circuit must ensure that receiving rights or the numbers of the chipcards are removed from the list, so that only the "most important" chipcard numbers and their receiving rights are stored in the pay-TV terminal.

The invention further relates to a pay-TV terminal that features at least a memory, a communication apparatus and a control and evaluation electronics which makes it possible for the specific data, particularly the receiving rights, to be stored in the pay-TV terminal and, in response to communication via the communication apparatus of the pay-TV terminal with a specific mobile data carrier, particularly with a chipcard, for this specific data to be routed to the chipcard.

In an embodiment according to the present invention the memory is a nonvolatile, preferably an EEPROM or a flash PROM, memory. The use of a non-volatile memory module is to ensure that, in the event of a power failure, the pay-TV terminal does not lose its stored data.

A control module of the control and evaluation electronics in the pay-TV terminal is responsible for carrying out an allocation between the specific data and the specific data carriers. The control module therefore has the function of correctly allocating the specific data (receiving rights) to the numbers of the chipcards stored in the list of the pay-TV terminal, in order to be able to store the data in the list.

An evaluation module of the control and evaluation electronics checks which mobile data carrier is in communication with the pay-TV terminal, in order thereby to permit the correct routing of the specific data. Consequently, the evaluation module has the function, inter alia, of checking whether a chipcard is in communication with the pay-TV terminal. If so, the evaluation module checks whether receiving rights are available for this chipcard, in order thus to transmit these receiving rights to the chipcard. If the chipcard in question, or its chipcard number, is not entered in the list, the evaluation module must ensure that this is done.

In addition, a priority circuit in the pay-TV terminal decides which specific data, particularly receiving rights, are deleted if the available memory space in the pay-TV terminal is exceeded. Therefore, should the list stored in the pay-TV terminal be completely filled with data, the priority circuit has the function of providing a logic to ensure that either further chipcards which are inserted into the terminal are ignored or, alternatively, that chipcard numbers stored in the list are deleted, so that "new" chipcards can be entered in the list.

A method according to the present invention and a device according to the present invention include the advantage that several customers can now access one pay-TV terminal with their personal chipcards and are therefore always able to receive new or additional receiving rights and to store them on their chipcards.

BRIEF DESCRIPTION OF THE DRAWINGS

Hereinbelow, the present invention is described in greater detail with reference to the drawings, in which: embodiment with reference to the drawings, in which.

DETAILED DESCRIPTION

Figure 1:
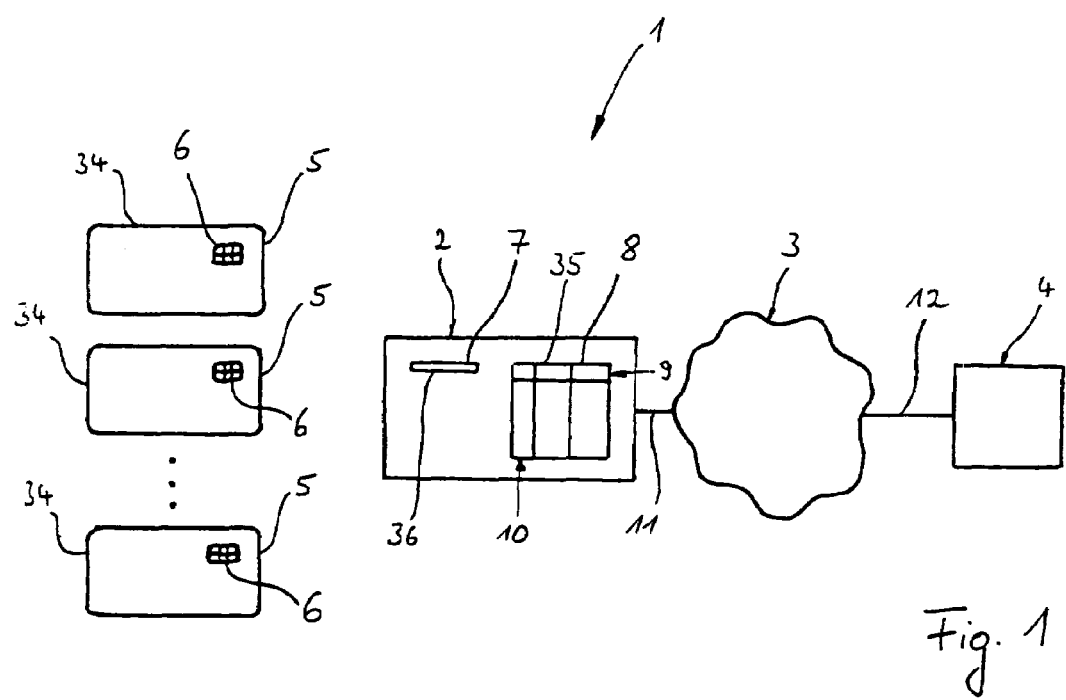
FIG. 1 shows a schematic diagram of a pay-TV system.

FIG. 1 shows a schematic scenario of a pay-TV system 1 used to receive and decode encrypted television programs.

Pay-TV system 1 includes a pay-TV terminal 2, a transmission medium 3 and a transmitter 4, both pay-TV terminal 2 and transmitter 4 being connected to transmission medium 3. FIG. 1 also shows a plurality of symbolically depicted mobile data carriers 34 in the form of chipcards 5 with their contacting elements 6. Pay-TV terminal 2 has a communication apparatus 36 in the form of a contacting device 7 used to accept chipcards 5. Further shown in pay-TV terminal 2 is a symbolically depicted memory 35 in the form of a list 8. List 8 is symbolically shown with rows 9 and columns 10, to indicate that data can be stored in a structured manner in list 8. Pay-TV terminal 2 is connected via a connecting cable 11 to transmission medium 3. Likewise, transmitter 4 is connected via a connecting cable 12 to transmission medium 3.

Figure 2:
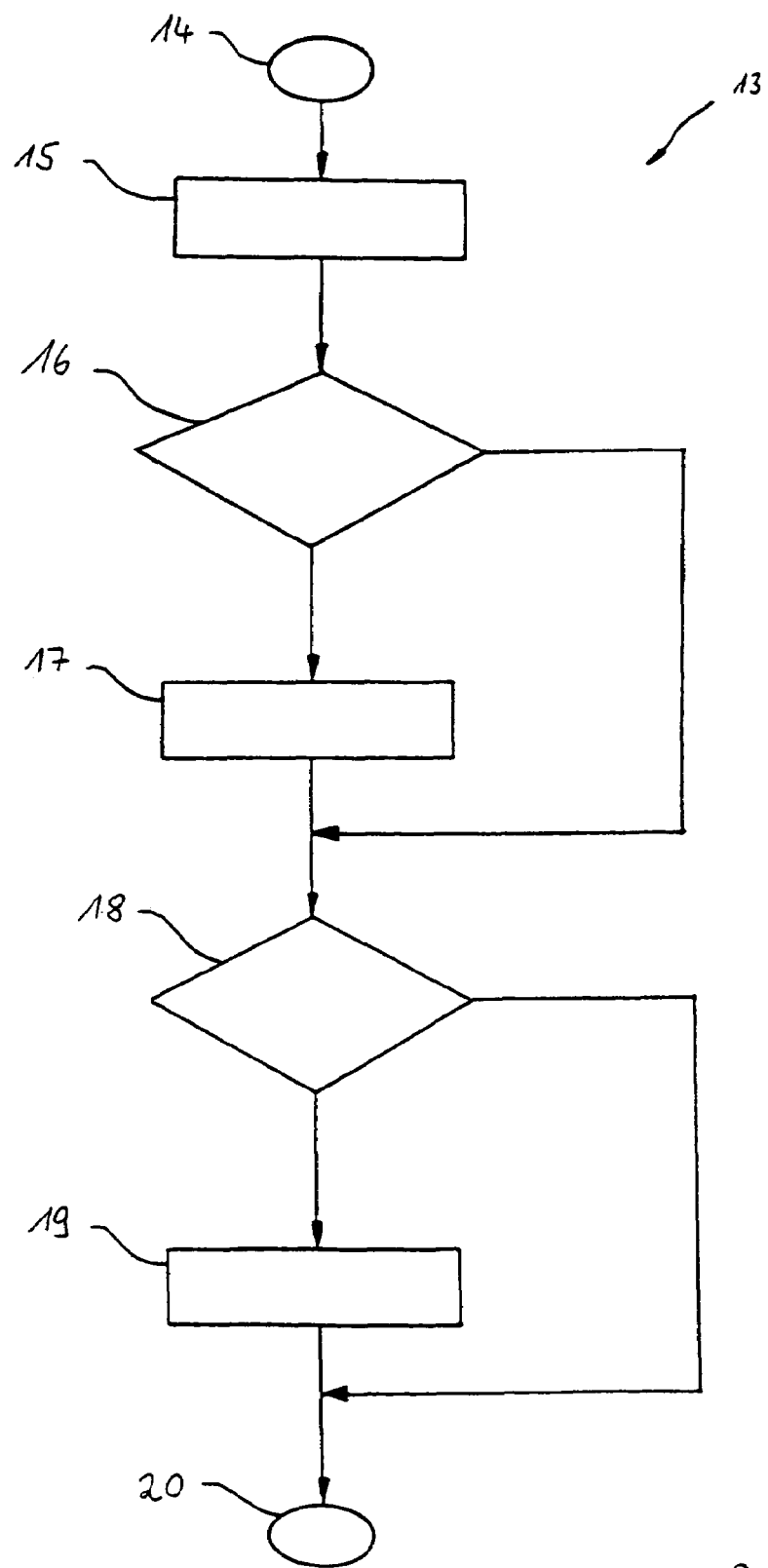
FIG. 2 shows a flow chart of the communication between a chipcard and a pay-TV terminal.

FIG. 2 shows a first, greatly simplified flow chart 13 in order to explain hereinbelow the communication between a chipcard 5 and a pay-TV terminal 2.

Figure 3:
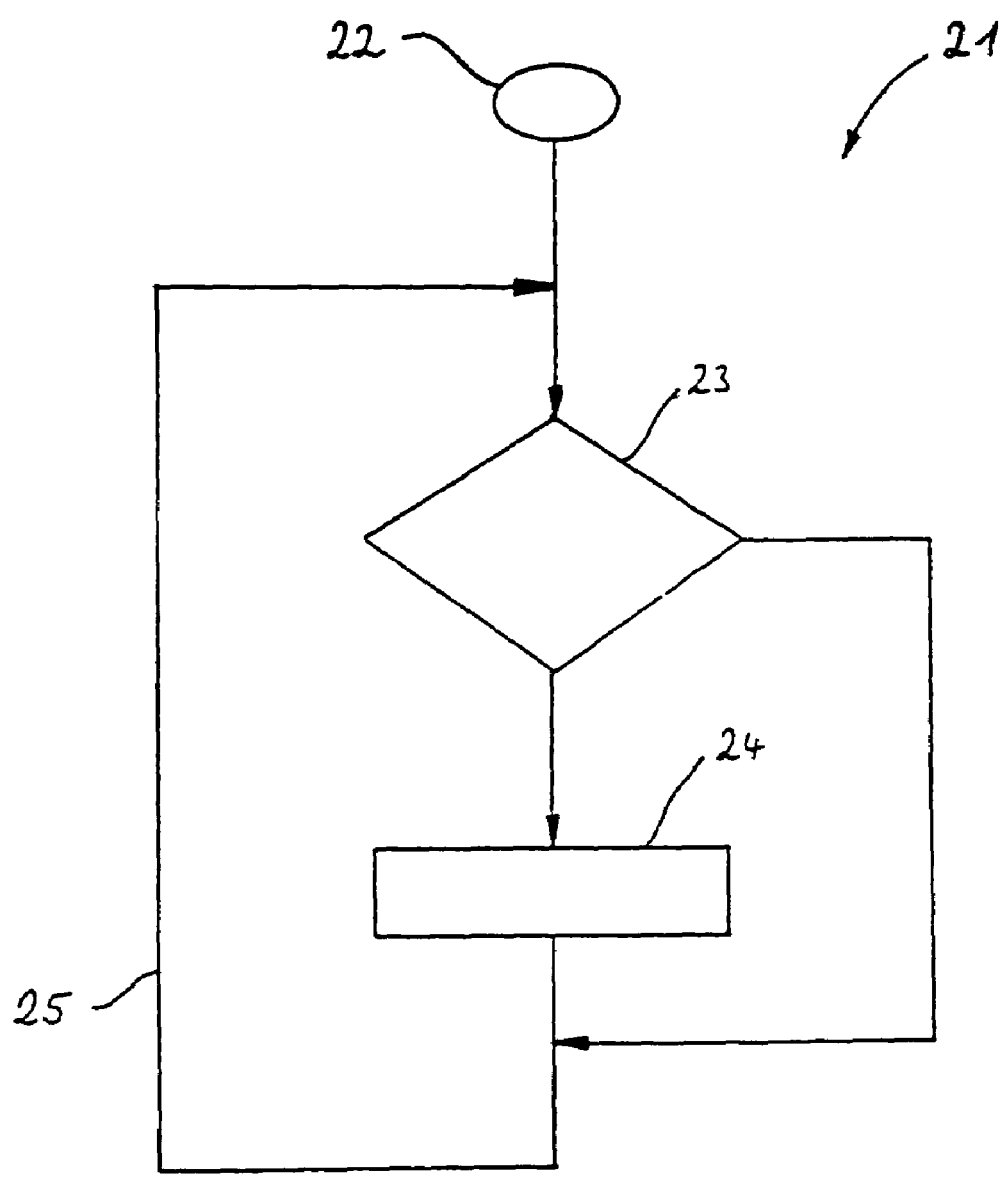
FIG. 3 shows a flow chart of the communication between a pay-TV terminal and a transmission medium.

A starting point 14, in which necessary software and/or hardware initializations are carried out, is followed by a first step 15. During step 15, pay-TV terminal 2 waits for a chipcard 5, in order to enter into communication with it. When a chipcard 5 with its contacting elements 6 is introduced into contacting device 7 of pay-TV terminal 2, a transition is made to a first branch point 16. At this first branch point 16, it is now checked whether the number of the chipcard is already stored in list 8, or whether it is a "new" chipcard 5. If a chipcard 5 is inserted which has not yet been entered in list 8 of pay-TV terminal 2, a switch is made to a step 17 in which the filter information and the number of chipcard 5 are transferred into list 8 of pay-TV terminal 2. If this step has already been executed in the past, then, starting from first branch point 16, this step 17 is skipped and a jump is made to a second branch point 18. If the chipcard is a "new" chipcard, then, starting from step 17, second branch point 18 is also reached. At second branch point 18, it is decided whether special data, particularly receiving rights, exist for this chipcard 5, the special data having been transferred at an earlier time or at this moment to pay-TV terminal 2 by transmitter 4 via transmission medium 3. If this is not the case, a jump is made directly to an end point 20 and no further steps are carried out. If, however, receiving rights exist for this chipcard 5, then a jump is made to a step 19. In this step 19, the receiving rights for inserted chipcard 5, stored in list 8, are transmitted to chipcard 5. Consequently, the receiving rights for this chipcard 5 have now been transmitted, through intermediate storage in list 8 of pay-TV terminal 2, to chipcard 5 of the customer. After step 19, no further actions are required, so that a jump can be made directly to end point 20. At end point 20, it is possible to carry out final activities which, however, are not relevant for the method of the present invention and are therefore not further described. For the sake of clarity, a necessary loop, starting from end point 20 back to starting point 14, is not shown. The second flow chart 21 in FIG. 3 shows, in greatly simplified and abstract form, the communication between pay-TV terminal 2 and transmission medium 3. After activation of pay-TV terminal 2, the sequence of second flow chart 21 is started at starting point 22. As at starting point 14 in FIG. 2, necessary hardware and/or software initializations are carried out at starting point 22. After starting point 22 has been executed, a transition is made to a branch point 23. At branch point 23, transmission medium 3 is constantly "monitored", so that there is a continuous comparison between the stored filter information of pay-TV terminal 2 and the receiving rights transmitted via transmission medium 3. If the filter information agrees with specific data from the receiving rights, a transition is made to a step 24. In this step 24, the receiving rights are then extracted from a transmitted data stream 33 and stored in appertaining row 9 of list 8. If the filter information does not agree with the specific data from the receiving rights, then step 24 is also not carried out. This comparison of the filter information and the specific data from the receiving rights is now constantly repeated, as is implied by loop 25 represented in FIG. 3.

Figure 4:
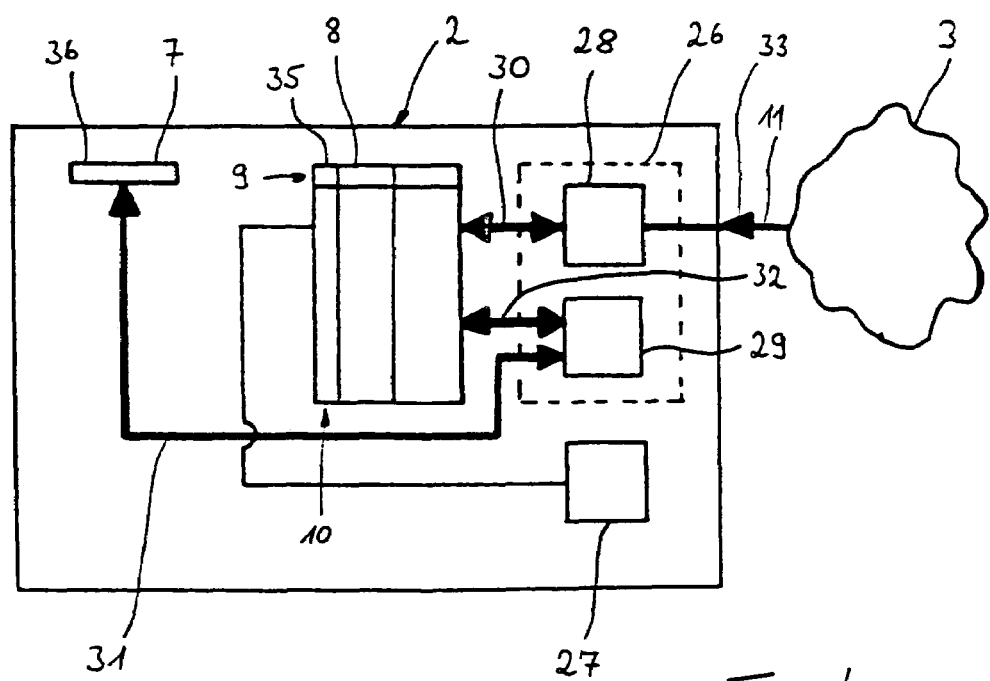
FIG. 4 shows a schematic block diagram of a pay-TV terminal.

FIG. 4 shows a schematic block diagram of a pay-TV terminal 2 with connecting cable 11 to transmission medium 3. Pay-TV terminal 2 possesses contacting device 7 and list 8. Additionally, pay-TV terminal 2 contains a control and evaluation electronics 26 and a priority circuit 27. Control and evaluation electronics 26 has a control module 28 and an evaluation module 29. For the sake of clarity, the relevant modules necessary for the reception of the data and the necessary decoding modules are not shown in FIG. 4. Via connecting cable 11, control module 28 "listens to" the data supplied via transmission medium 3, so that, as apparent in FIG. 4, data stream 33 [flows] in the direction of pay-TV terminal 2. Control module 28 implements flow chart 21 which was explained in FIG. 3, so that, as shown in FIG. 4, a bidirectional connecting cable 30 between control module 28 and list 8 must be provided.

Evaluation module 29 provides a communication with contacting device 7 via a connecting cable 31. This connecting cable 31 must likewise be bidirectional, so that, firstly, data can be exchanged in the direction of contacting device 7, and therefore in the direction of chipcard 5, and, secondly, data can be exchanged in the direction of evaluation module 29 and therefore in the direction of list 8. Using a bidirectional connecting cable 32 ensures that, on one hand, the filter information can be transferred from the chipcard into list 8, and on the other hand, the receiving rights can be transmitted via this connecting cable 32 to chipcard 5. Thus, evaluation module 29 assumes the function represented in FIG. 2 on the basis of flow chart 13.

What is claimed is:

1. A method for routing data in a pay-TV terminal, the data including receiving rights for a mobile data carrier, the method comprising:

transmitting the data from a transmitter via a transmission medium to the pay-TV terminal;

buffering the data using the pay-TV terminal;

establishing communication between the mobile data carrier and the pay-TV terminal; and then routing the receiving rights to the mobile data carrier and storing the receiving rights in the mobile data carrier, wherein the mobile data carrier is a first chipcard and a second chipcard, storing in a list a respective chipcard number and respective chipcard-specific filter information for the first chipcard and the second chipcard so as to enable the pay-TV terminal to cooperate with both of the first chipcard and the second chipcard; and deleting the receiving rights using a preselected prioritization if a size of the list is exceeded.

2. A device for decoding pay-TV programs, the device comprising:

a control and evaluation electronics;

a communication apparatus for communicating with a first mobile data carrier via an interface;

a memory for use as a list so as to buffer data transmitted from a transmitter to the device via a transmission medium using the control and evaluation electronics, at least a first portion of the buffered data being routed immediately or at a later time to the first mobile data carrier; and a pay-TV terminal having a priority circuit for determining which of the first portion of the buffered data and a second portion of the buffered data are deleted upon an exceeding of a space in the memory.

* * * * *